Figure 1:
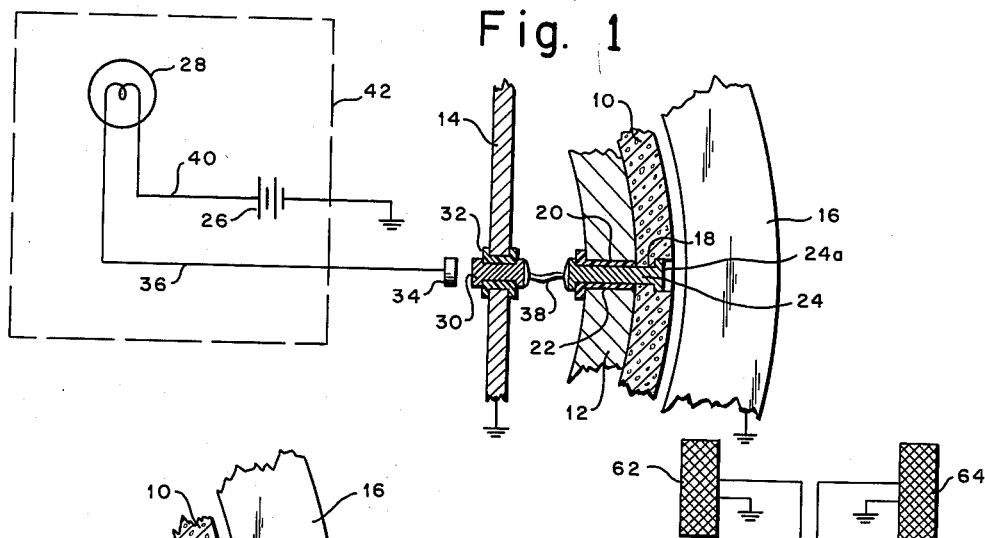

April 25, 1961  S. RIZZO ET AL  2,981,929
ELECTRICAL BRAKE LINING WEAR DETECTOR
Filed Feb. 17, 1958

INVENTORS
Samuel Rizzo
David Biser

United States Patent Office 2,981,929
Patented Apr. 25, 1961

2,981,929

ELECTRICAL BRAKE LINING WEAR DETECTOR

Samuel Rizzo, 6004 N. Water St., and David Biser, 4557 Camac St., both of Philadelphia, Pa.

Filed Feb. 17, 1958, Ser. No. 715,793

2 Claims. (Cl. 340—52)

The present invention relates to an electrical brake lining wear detector and more particularly to an electrical brake lining detector for indicating the condition of brake linings without the necessity of opening the brakes to make visual examination.

At the present time the inspection of the condition of brake linings requires that the brake unit or housing enclosing the brake structure be opened in order to make the examination directly, and in the case of automobiles this requires the relatively laborious process of jacking up the car and removing the wheels, and then reversing these steps after the inspection is complete. While this procedure is merely inconvenient in the case where the brake linings are in a private or pleasure automobile, in commercial vehicles, and fleets of same, such as taxi cabs, trucks, buses and the like, where there is a necessity for a continuous inspection program, this process is laborious, time consuming, inefficient and expensive.

The present invention provides apparatus for making a quick and effective inspection of a lining or the condition of a brake lining without the necessity of removing the wheel or other enclosing apparatus for inspecting the brake lining directly. The apparatus consists in one embodiment, of an electrical element imbedded in the brake lining and utilizing the brake drum as a second electrical element so that electrical contact is made when the brake linings are reduced by wear to a particular point where replacement is necessary. Indicator apparatus is provided for indicating when this contact is made. In another embodiment of this invention provision is made to indicate the state of wear of the brake linings as well as merely when the brake lining has been reduced to a point where changing is necessary. The apparatus hereinafter described is capable of being built into the vehicle as might be desired in a pleasure or private automobile or as portable apparatus such as might be used in commercial vehicles where a single unit is necessary to test quickly and efficiently a large number of vehicles.

It is thus the first object of this invention to provide apparatus for indicating the condition of a brake lining without the necessity of examining or opening the housing enclosing the brake lining.

Another object of this invention is the provision of apparatus for indicating the state of friction material otherwise inaccessible.

A further object of this invention is apparatus for providing instantaneous indication when brake linings or other inaccessible wearable material reaches a point of wear when the material must be changed.

Still another object is provision of apparatus to test by remote means the condition of brake linings without interfering with the normal operation of the equipment carrying the brake linings.

Figure 1A:
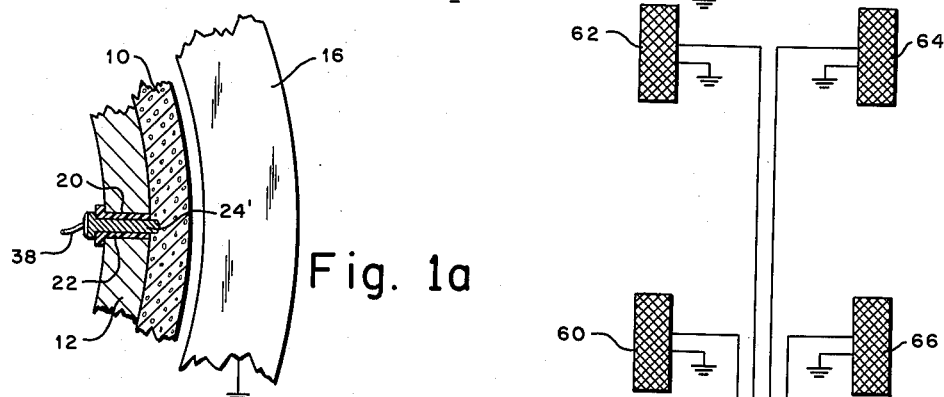
Figure 3:
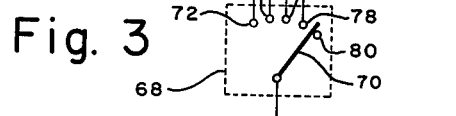
Figure 2:
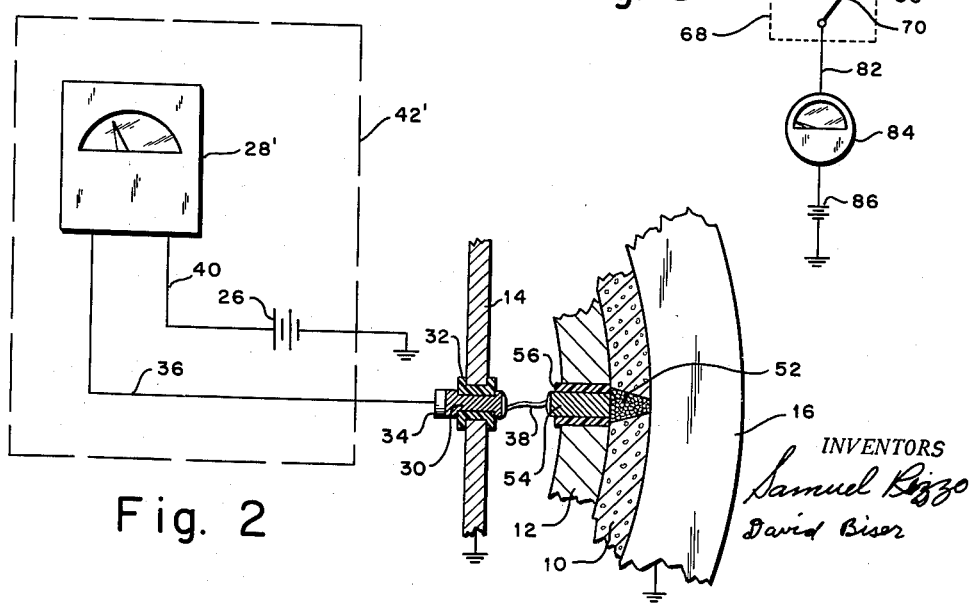

The exact nature of this invention as well as other objects and advantages thereof will be readily apparent from consideration of the following specification relating to the annexed drawing in which:

Figs. 1 and 2 show different embodiments of this invention; Fig. 1a shows a slight modification of Fig. 1; and Fig. 3 shows a typical installation of this apparatus.

Referring to Fig. 1 for one form of this invention there is illustrated schematically for use with a brake lining 10 mounted in conventional fashion on a brake shoe 12 supported by a brake plate 14 in operative relationship with a brake drum 16 for contacting brake lining 10 upon the application of the brakes as is understood in the art. The apparatus just described is illustrated schematically in a simplified presentation and in actual operation the brake lining 10 and brake shoe 12 are so disposed that they are supported on the face of brake plate 14. For accomplishing the purposes of this invention brake lining 10 is provided with a counter-sunk hole 18, and brake shoe 12 is provided with a hole 20 having an electrically insulated insert 22. A rivet or plug 24 of conductive material having any convenient shape is placed or fitted into hollow insert 22 and extends to the bottom of the counter-sunk opening in hole 18. The top surface 24a of the electrically conductive rivet 24 is located at a point intermediate the outer and inner surface of brake lining 10 representing the point of wear at which brake lining 10 should be replaced. To complete the electrical system there is provided a battery source 26, an electric light bulb 28, and an electrically conductive rivet 30 mounted on brake plate 14 and electrically insulated therefrom by an insulator insert 32. A separable contact 34 connected by lead 36 to one side of bulb 28 permits selective contact with conductive rivet or plug 30. The opposite or interior surface of conductive plug 30 is connected by electrical lead 38 to one end of conductive plug 24 imbedded in brake shoe 12. The battery 26 is connected by electrical lead 40 to the opposite side of bulb 28, and the negative side of battery 26 is grounded as in brake drum 16. As indicated by the phantom enclosure 42, bulb 28 and battery 26 may comprise a portable unit with lead 36 and separable contact 34 extending. Instead of a rivet 24 requiring a counter-sunk hole 18, a pin such as 24' in Fig. 1a may be utilized.

The operation of the device illustrated in Fig. 1 is such that in the event of the ultimate wear of lining 10 the application of brake lining 10 to brake drum 16 will result in an electrical contact being made between brake drum 16 and the top surface 24a of conductive rivet 24 imbedded in brake lining 10, thereby completing the electric circuit illustrated and lighting up the bulb 28. Of course, instead of bulb 28 a meter or any other such indicating device may be used.

Because it is sometimes desired to provide apparatus to indicate the state of wear of the brake lining rather than merely whether it requires replacing or not, the embodiment shown in Fig. 2 may be used. In this arrangement there is also provided the brake plate 14, the brake shoe 12, brake lining 10, brake drum 16, the battery source 26, a meter 28', conductive plug 30, with insulated insert 32, and a separable contact 34 connected to an electrical lead line 36. In this arrangement the brake lining 10 is provided with a carbon, or other suitable material, element 52 of known resistance having any convenient shape, such as the conical shape, as illustrated. For contact with plug 52 there is provided a conductive insert 54 in brake shoe 12 and insulated therefrom with an insulated sleeve 56. In the operation of the device shown in Fig. 2 the gradual wearing down of the outer surface of brake lining 10 will result in the simultaneous wearing down of one end of carbon insert 52. Thus the amount of current flow through meter 28' would depend on the resistance of the carbon element 52 which, of course, would vary with the degree of wearing down. Hence, the meter 28' may be calibrated to show the degree of wear of lining 10.

An illustrative installation which may be of a permanent nature in a vehicle such as an automobile or a truck is schematically represented in Fig. 3. There is shown here the wheel assemblies 60, 62, 64 and 66 each housing a brake drum, lining and shoe as is understood in the art and as illustrated in Figs. 1 and 2. A switching unit 68 having a movable contact 70 and the fixed contacts 72, 74, 76, 78 and 80 may be mounted on the vehicle. Contact 80, of course, would be a switch off position whereas the other contacts just mentioned would select one or more of the brake drums. Thus, each brake unit has a lead line corresponding to lead line 36 in Figs. 1 and 2 connected to its associated contact in switching box 68 illustrated. Then the movable contact 70 is connected through line 82 to a meter 84 which is energized through a battery source 86. This arrangement functions in such a manner as to permit the operator by moving contact 70 to the particular contact to select the particular brake lining which he desires to check, and, using the embodiment of the instant invention illustrated in Fig. 2, meter 84 would indicate the degree of wear in the lining for each particular brake lining. The arrangement or installation illustrated in Fig. 3 can, of course, be used to accommodate the particular arrangements shown in either Fig. 1 or Fig. 2. Of course, if the simplified indicator arrangement of Fig. 1 is used then instead of meter 84, a simple light such as bulb 28 shown in Fig. 1 would be used.

It is thus seen that there has been provided novel arrangements for indicating the condition of brake linings or other materials which wear and must be replaced at a particular point in wear. The arrangements described herein above are particularly adaptable for use in the inspection of brake linings on vehicles and particularly for commercial applications where the savings resulting from the use of equipment of this type would be considerable. For example, in large tractor or trailer trucks with multiple wheel assemblies where the condition of all brake assemblies should be known at all times for maximum safety, the cost of installing the system herein described would be small in comparison to the ultimate cost of making frequent visual inspections. The apparatus herein described can also be installed, of course, on the vehicles during the manufacture of the wheel or brake drum. The other advantages of using devices of this type are obvious. For example, such apparatus would permit the scheduling of brake relining jobs to be made in advance and would also permit accurate information to be obtained on factors affecting brake wear.

It should be understood, of course, that the foregoing disclosure relates to only prefered embodiments of this invention and that numerous modifications or alterations thereof may be made without departing from the spirit and the scope of the invention as set forth in the appended claims.

What is claimed is:
1. Brake lining wear detector apparatus for use with an electrically insulating brake lining mounted along its inner surface on a brake shoe and a brake drum having an electrically conductive surface for intermittent contact with the outer surface of said brake lining, comprising, electrical resistance means having a resistance variable with its length extending through said brake lining and having a surface flush with said lining outer surface so that the length of said electrical resistance means is reduced by wear concurrently with wear of said lining, and electrical circuit means including electrical energy source means and current indicator means for providing a continuous electrical circuit from said brake drum through said electrical resistance means thereby providing current flow through said indicator means when said conductive surface of said brake drum makes contact with said electrical resistance means and said current flow having such a value as to indicate the amount of said electrical resistance means worn away by the action of said brake drum and thereby indicate the state of wear of the brake lining.

2. Brake lining wear detector apparatus for use with a brake lining mounted along its inner surface on a brake shoe and a brake drum having an electrically conductive surface for intermittent contact with the outer surface of said brake lining, comprising, electrical resistance means imbedded in said brake lining having a surface flush with said lining outer surface and extending into said lining, said electrical resistance means having a resistive value as a function of its length, and electrical circuit means including electrical energy source means and current indicator means for providing a continuous electrical circuit from said brake drum through said brake shoe to said electrical resistance means thereby providing current flow through said indicator means when said conductive surface of said brake drum makes contact with said electrical resistance means and said current flow having such a value as to indicate the length of said electrical resistance means worn away by the action of said brake drum and thereby indicate the state of wear of the brake lining.

References Cited in the file of this patent
UNITED STATES PATENTS

| | | |
|---|---|---|
| 1,902,759 | Cataudella | Mar. 21, 1933 |
| 2,146,357 | Schweikle | Feb. 7, 1939 |
| 2,183,700 | Sinclair | Dec. 19, 1939 |
| 2,621,274 | Maddox | Dec. 9, 1952 |
| 2,629,862 | Sawyer | Feb. 24, 1953 |
| 2,636,090 | Branschofsky | Apr. 21, 1953 |
| 2,669,876 | Lentz | Feb. 23, 1954 |
| 2,700,760 | Brown | Jan. 25, 1955 |
| 2,731,619 | Fratus | Jan. 17, 1956 |
| 2,731,936 | Fowler | Jan. 24, 1956 |